Oct. 2, 1956 P. WOLAVER 2,764,828
SEQUENCE MECHANISM
Filed March 9, 1955 3 Sheets-Sheet 1
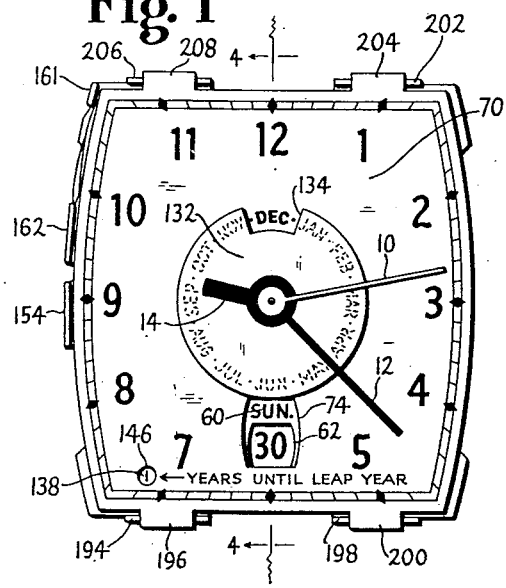
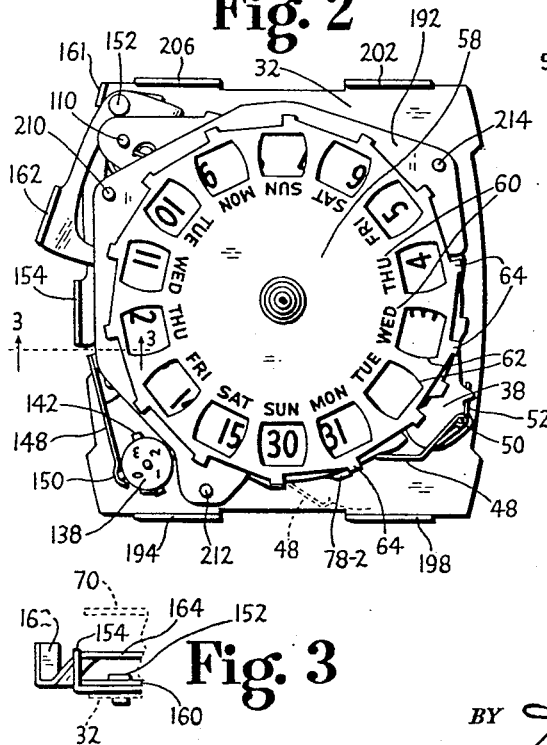
INVENTOR.
Park Wolaver Oct. 2, 1956     P. WOLAVER     2,764,828
SEQUENCE MECHANISM
Filed March 9, 1955     3 Sheets-Sheet 2
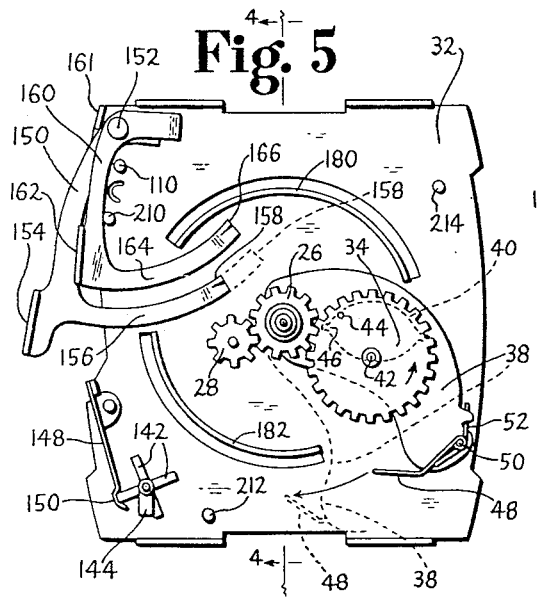
Fig. 5
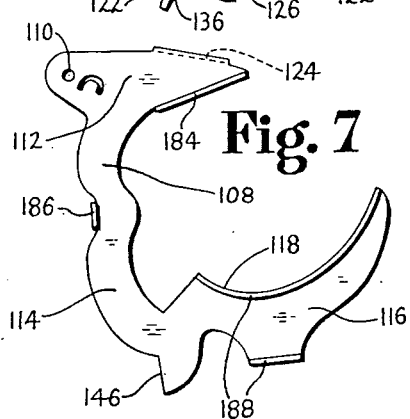
Fig. 6
Fig. 7
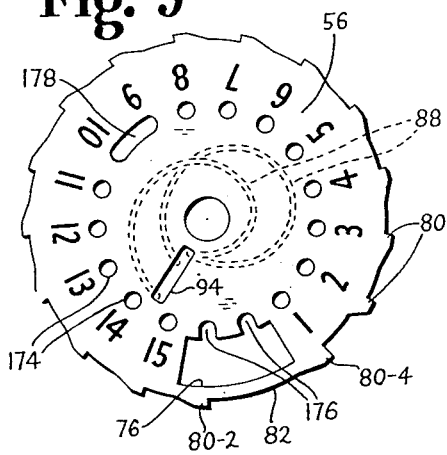
Fig. 8
Fig. 9
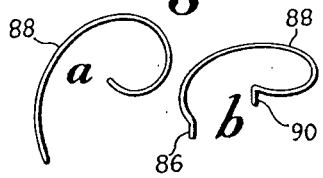
Fig. 10
INVENTOR.
Park Wolaver
BY Oct. 2, 1956 P. WOLAVER 2,764,828
SEQUENCE MECHANISM
Filed March 9, 1955 3 Sheets-Sheet 3

INVENTOR.
Park Wolaver
BY 

United States Patent Office 2,764,828
Patented Oct. 2, 1956

2,764,828

SEQUENCE MECHANISM

Park Wolaver, Chicago, Ill., assignor of one-half to Nora Young Wolaver

Application March 9, 1955, Serial No. 493,154

9 Claims. (Cl. 40—115)

My invention relates to mechanisms suitable for automatically exhibiting a series a series of displays in pre-determined order, and for analogous uses. It includes among its objects and advantages relative simplicity, substantial infallibility of operation, and an approximate doubling of the size of indicia that can be displayed by a device of limited, predetermined, over-all dimensions.

Other objects and advantages of the invention will become apparent as the description proceeds.

In the accompanying drawings:

Figure 1 is a front elevation of a device according to the invention;

Figure 2 is a front elevation of the same with the clock hands, month indicator and clock face removed;

Figure 3 is a detail as on line 3—3 of Figure 2;

Figure 4 is a vertical section on line 4—4 of Figure 1;

Figure 4a is a detail of the leap year dial and cam;

Figure 5 is a plan view of the back plate and actuating means with the other parts removed;

Figure 6 is a plan view of the month dial;

Figure 7 is a plan view of the adjustment lever for automatic adjustment of the length of the cycle;

Figure 8 is a plan view of the covered day member carrying the last half of the cycle;

Figure 9 is a plan view of the covering day member carrying the first half of the cycle;

Figure 10a is a plan view of the interconnecting transmission establishing the lost motion connection between the covering and covered dials;

Figure 10b is a perspective view of the same transmission;

Figure 11:
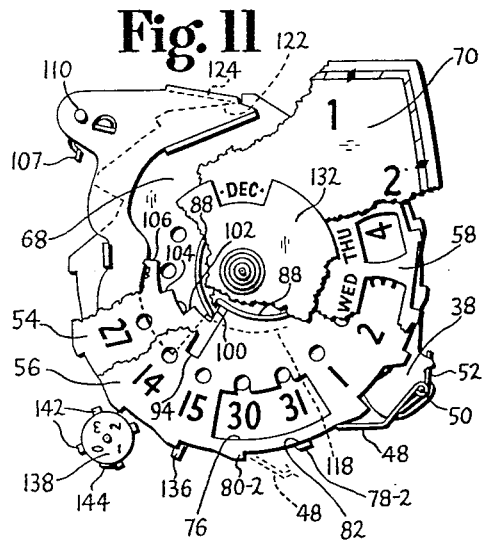
Figure 11 is a front view partly broken away to indicate the relative positions of the parts in one condition of operation.

In the embodiment selected to illustrate the invention, the application of the invention is to a perpetual calendar clock, which is one of the common uses for which the invention is adapted.

The clock mechanism per se may be of any conventional or desired variety, and this description has not been encumbered with the details of conventional clock mechanisms. I have indicated the type of hands common in synchronous electric clocks, including a second hand 10, a minute hand 12 and an hour hand 14. The second hand 10 is on the central shaft 16 which carries a pinion 18 at its rear end. The minute hand 12 is on a sleeve 20 which carries a drive gear 22 at its rear end. The hour hand 14 is on a sleeve 24, the rear end of which is enlarged to form a gear 26. The gear 26 is driven at two revolutions daily by a pinion 28 on the same shaft with a co-axial drive pinion 30. The drive pinions 18 and 30 and the drive gear 22 are behind the back plate 32, which constitutes the frame supporting the entire display mechanism. They are positioned in conventional relationship to be engaged independently with the driving members of a conventional synchronous electric clock. It will be obvious that this relationship may be changed to conform to positions that will fit clocks of a wide variety of designs.

I have provided actuating means for moving the display parts step by step. Referring to Figure 5, the gear 26, which turns with the hour hand two revolutions daily, meshes with a fixed gear 34 which has twice the diameter and rotates once each day. Pivoted on the stationary sleeve 36, which is integral with the back plate 32, is a rocking actuator arm 38. The arm 38 lies between the gear 34 and the back plate 32, and has a cam shaped opening, indicated in Figure 5 in dotted lines at 40, which opening at all times receives the shaft 42 on which the gear 34 is pivoted. A pin 44 projects downwardly from the gear 34 into the opening 40. The position illustrated in full lines in Figure 5 corresponds to about half past nine at night. In about an hour and a half the pin 44 will reach the point 46 at the left end of the opening 40, and engage the wall of that opening at the point in the opening closest to the pivot 36. Thereafter, in about an hour and a half, between 11 o'clock and 12:30 at night, the arm 38 will be pushed in a clockwise direction from the full-line position to the dotted-line position of Figure 5. After the dotted-line position is reached, the pin 44 moves down the concave lower arc of the opening 40 till it comes to the point remote from the point 46. It will then engage the wall of the opening 40 and move the arm 38 back to the full-line position of Figure 5. Because this contact is at a radius about three and one-half times as great with respect to the central axis, the return movement of the arm 38 will take about three and one-half times as long, but this is immaterial because the step-by-step shifting of the display elements occurs during the clockwise movement only. As soon as the arm 38 has returned to the full-line position, the pin 44 will take about eight hours to traverse the circular arc defining the upper boundary of the opening 40, and thus complete the twenty-four hour cycle of operation, ending in the position of Figure 5.

A connection is provided for connecting the arm 38, during its forward movement only, to render it operative to move the display members. I have illustrated a pawl 48 pivoted at 50 and resiliently urged in a clockwise direction, as by a spring 52. The leading edge of the pawl 48 is adapted to engage one or more of the notches in the notched dial members illustrated in Figures 2, 6, 8 and 9, and the entirety of the shifting sequences of all the display members is effectuated thereby.

The operation of the notched dial members is in predetermined irregular sequence corresponding to the calendar, and is obtained by varying the depths of the notches in the various members and by an adjustable lost-motion connection between the covered day dial 54, illustrated in Figure 8, and the covering day dial 56, illustrated in Figure 9.

Proceeding from front to back, the first dial is the weekday dial 58. As clearly shown in Figure 2, it is provided with indicia 60 for fourteen days, constituting two weeks, and fourteen windows 62 spaced radially beyond the indicia. Beyond the windows 62 the peripheral rim has fourteen projections 64. As best indicated at the bottom of Figure 4, the projections 64 stick down far enough so that the weekday dial 58 is always moved with every reciprocation of the actuator arm 38, but the depressions between the projections 64 are deep enough so that, when other obstacles are removed, the pawl 48 can swing up far enough to get at the projections 66 on the month dial 68 illustrated in Figure 6.

The weekday dial has no other operating connection, or interconnection, with any of the other dials. As best indicated in Figure 4, it lies next behind the clock face 70 and is restrained from random movement by gentle friction contact with a spacing washer 72. The indicia 60 are spaced appropriately to occupy the upper portion of the window 74 in the face plate 70. Through this window the observer sees the day of the week at the top of the contour of one of the smaller windows 62 in the weekday dial 58. Through this smaller window the user will observe one of the day indicia, which may be on the covering day dial 56 or on the covered day dial 64 exposed by the window 76 in the covering day dial.

By putting two weeks on the weekday dial 58, all the movements for all the display members are kept within a relatively close range, one-fourteenth of a revolution for the weekday dial, one-twelfth for the month dial, and one-seventeenth for the day dials. Therefore, with the stroke of the pawl 48 arranged to take care of the month dial 68, with a reasonable margin for certainty of operation, the return stroke of the pawl, as best illustrated in Figure 2, brings it to rest about one-fourth of a step beyond the next projection 64 on the weekday dial and a little more than half way beyond the next projections 78 and 80 on the day dials 54 and 56.

Next back of the weekday dial is the covering dial 56 of Figure 9. This is subdivided into seventeen substantially equal sectors and provided with sixteen projections 80. In register with the window 76 there is a land 82 of double length. It will be obvious that after the pawl has pushed on the projection 80-2 to move the dial 56 and carry the indicia "15" out from behind the window 74, the pawl will slide back and forth on the land 82 and find no projection, so that the dial 56 will remain there indefinitely until it is displaced by some other instrumentality.

Next back of the covering dial 56 is the covered dial 54, illustrated in Figure 8. This is also divided in seventeen equal sectors with a hiatus at 84. It will be apparent that after the pawl 48 has pushed on the projection 78-2 to move indicia "31" into display position, the pawl will slide back and forth on the land 84, and the dial 54 will remain stationary until it is displaced by some other instrumentality.

The lost-motion interconnecting transmission between the dials 54 and 56 is a downwardly projecting pin 86 at the outer end of an expansion spring 88, which expansion spring has a duplicate fulcrum pin 90 projecting from its inner end. In undistorted condition this spring has the configuration clearly illustrated in Figures 10a and 10b. The pins 86 and 90 are resiliently urged to the widely separated position shown. The spring 88, as best illustrated in Figure 4, is loosely housed between the weekday dial 58 and the covering dial 56 in a space defined by a shallow offset indicated at 92 in Figure 4. The pins 86 and 90 project through the covering dial 56 in a radial slot 94 with the pin 90 nearest the axis, and the pin 86 at the outer end of the slot except when restrained from outward movement.

The pins 86 and 90 have their lower ends positioned in a wide arcuate slot 96, in the covered day dial 54. This slot has a long radial limiting face at 98 positioned to be engaged by the pin 86. When the covering dial 56 has carried the pin 86 to the limit of relative movement in that direction, the covering dial 56 begins to drag the covered dial 54 along with it, with "16" on the covered dial properly spaced to follow "15" on the covering dial.

The other end of the slot 96 has a plurality of radial abutments arranged at different distances from the axis. The abutment 100 is positioned to engage the pin 86 when the dial 56 is arranged with its indicia "1" immediately following the indicia "31" on the covered dial 54. The next abutment 102 is offset one step in angular position, and if the pin 86 is at the radial distance that will bring it against this abutment, the dial 54 will drag the dial 56 along with it, with indicia "1" superposed on and covering indicia "31" and adjacent indicia "30." The abutment 104 is one notch farther from the axis and one step farther in angular position, to drag the dial 56 with its indicia "1" adjacent "29." The fourth abutment 106 will drag the dial 56 with indicia "1" adjacent indicia "28."

It will be apparent that by preconditioning the position of the pin 86 for selective engagement with a predetermined abutment 100, 102, 104, 106, the dial 54 may be made to drag the dial 56 along with it, with the last exposed indicia on the dial 54 corresponding to the last day of any month in the year, including February of a leap year.

Next back of the covered day dial 54 is the preconditioning means for the transmission pin 86. The bell crank lever 108 is separately illustrated in Figure 7. It is pivoted on a fixed pintle at 110 and comprises a top horizontal arm 112, a descending arm 114, and a bottom cam arm 116 having a cam edge 118 adapted to engage the pin 86 and limit its radial outward movement in the slot 94.

Next back of the preconditioning means is the month dial 68 having twelve projections 66 corresponding to the months of the year. The land in front of each projection varies in height and is a contact means for positioning the bell crank lever 108. The lands numbered 122 are seven in number and at a radius corresponding to the months of January, March, May, July, August, October and December. An overlying flange 124 at the outer end of the upper horizontal arm of the bell crank lever, when riding in contact with these lands, will lift the cam 118 to the position of Figures 11 and 12 where the pin 86 is held in position to be actuated only by the abutment 100. The lands numbered 126 are four in number and correspond to the months of April, June, September and November. When the flange 124 rests on them, the pin 86 will be allowed to move out one step further in position to be actuated by the abutment 102. The land 128 corresponds to the month of February. When the flange 124 rests on it, the bell crank lever moves counterclockwise far enough to let the spring 86 engage the abutment 106.

In a stationary clock standing on a mantelpiece or the like, the force of gravity and the force of the spring 88 would be entirely adequate to keep the flange 124 in working contact with its land. However, to provide an assembly that can be used in a portable time indicator, subjected to vibration or to being held in various inverted positions, I provide resilient means, such as the spring 107 indicated in Figure 4, to urge the bell crank lever in a clockwise direction and to prevent rattling or incorrect position of the transmission pin 86 under all conditions of service.

The month dial of Figure 6 is not an indicator. It carries a sleeve 130 on which is mounted the indicator dial 132 in front of the clock face 70. This indicator dial is shaped to cover the indicia on the clock face, indicating the twelve months of the year, except for a single notch 134 wide enough to expose the indicia for one month. In Figure 1 the month is December, and December is placed on the clock dial in radial alignment with the number "12," which also indicates twelve o'clock. Since the indicator 132 rotates in a clockwise direction, the month January is in radial alignment with the hour number "1," the month February in radial alignment with the hour number "2," and so on. In this way the face of the clock dial itself is an aid to the almost unconscious thinking of the user whenever he writes a date by giving a number for the month instead of writing out the letters constituting an abbreviation of the name of the month.

At the time the day number "1" is moved into register with the window 74, the month dial of Figure 6 should also turn to the next month. To enable the pawl 48 to move in far enough to do this, the land immediately following the projection 80–4 on the covering day dial 56 is made deeper than any other land on that dial, and deep enough to let the pawl move in and get a purchase on one of the projections 66.

This may occur in any one of four different positions of the covered day dial 54. Accordingly, the long land 84 and the shorter lands back of the projections 78–4 and 78–6 on the covered day dial 54 are also deeper, and deep enough not to get in the way of the pawl 48, when the covering dial 56 lets it come up to engage the month dial 68.

Figure 15:
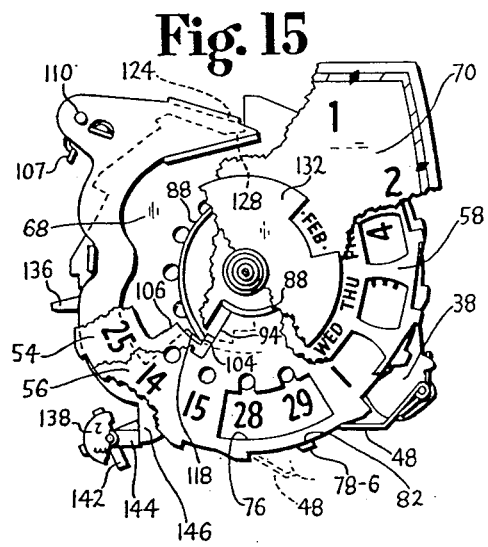
Figure 15 is a similar plan view showing a fourth position of the parts.

The land 128 provides for correct functioning in connection with February, except when it is leap year. The month dial 68 carries a prong 136 offset toward the back plate 32, as clearly indicated in Figure 4, so that it will not get in the way of the pawl 48. The leap year dial 138 is mounted on an individual pintle 140 which carries four radial spokes 142 spaced apart equally and in the plane of the offset prong 136. The same shaft also carries a blocking projection 144 positioned in the plane of the bell crank lever 108 and adapted to obstruct the movement of the heel 146 on the bell crank lever, when the block 144 is in that one of its four positions indicated in Figure 15, where the heel 146 will come into abutment with it. It will be noted that in Figure 15 the flange 124 has not moved all the way down onto the land 128, but is slightly spaced above it. Because of this, the cam 118 is a little higher and the pin 86 has not been allowed to move down far enough to engage the abutment 106 but passes radially inside that abutment until it reaches the abutment 104, and drags the covering dial along in the relative position indicated in Figure 15, with the indicia "1" adjacent "29" on the covered dial.

I provide a miniature window 146 in the lower left hand corner of the clock face identified by the caption "years until leap year." The dial 138 carries the indicia " 0 1 2 3" arranged in rotation to appear in proper sequence through the window 146. Retaining means in the nature of a leaf spring 148 with a cup shaped end at 150 engage the end of one of the spokes 142 during intervals between actuation of the leap year dial and the prong 136 dislodges the rotating parts from this holding means and pushes them positively into frictionally held engagement in a new position advanced ninety degrees.

Figure 14:
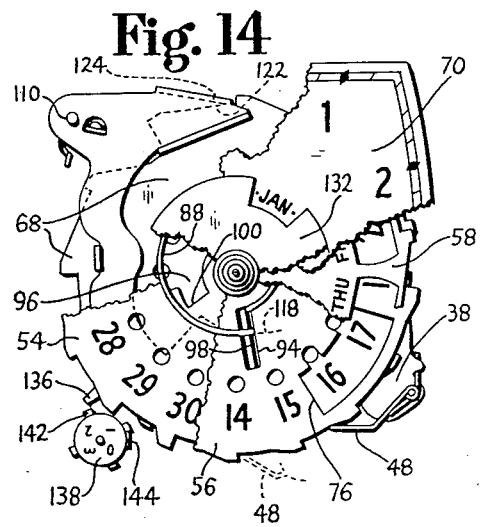
Figure 14 is a plan view similar to Figure 11, showing a third position of the parts.
Figure 12:
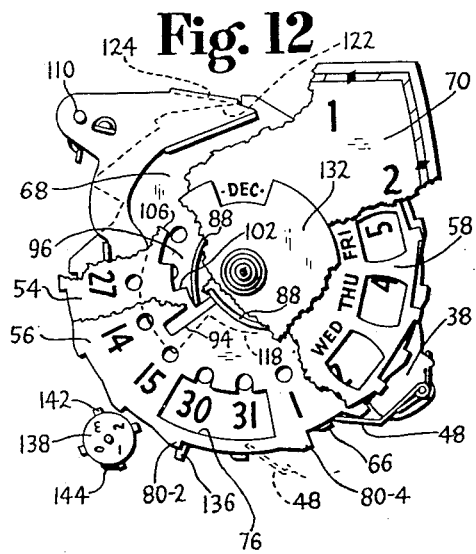
Figure 12 is a similar view indicating a different position.

The operation of the device is further clarified in Figures 11, 12, 14 and 15. In Figure 11 the parts are in the positions of Figures 1 and 2. The display indicates Sunday, December 30. The pin 86 is in operative engagement with the abutment 100. The next cycle of the actuator 38 will move the weekday dial and both the day dials in unison, and the indication will change to Monday, December 31. That is the position of Figure 12. In that position the low land behind the projection 80–4 has permitted the pawl 48 to move in far enough to engage the next projection 66 on the month dial, and the next cycle of the actuator 38 will give an indexing movement to the weekday dial, the month dial and indicator, the covering dial, and the leap year dial. This will move the month indicator to indicate January, and the weekday dial to indicate Tuesday, the covering dial to indicate "1," and the leap year dial to indicate "0." The covered dial will not move, and the indicia "31" on the covered dial will remain in place under the indicia "1" on the covering dial. This is because the long hiatus land 84 carries no projection and the pawl has no operative connection to enable it to move the covered dial 54. Subsequent operations will continue until the indication is January 14, as indicated in Figure 14. The pin 86 has now gone all around the slot 96 and is in operative engagement with the abutment 98. Also, the window in the covering dial following the indicia "15" is over indicia "16" and "17" on the covered dial. The next two operations will move both dials in unison, first to change the display to January 15, and second to change it to January 16, with the indicia "15" on the covering dial moving past the window 74 and out of sight. Thereafter, the covering dial will remain idle, and the pawl 48 will operate step by step on the covered dial only, until the day dials are back in the identical position of Figure 11, but with the month indicator showing January and in position to move to February on the second actuation after the position of Figure 11.

After the device is once in operation, stoppage of the clock could be corrected for by turning the clock hands through the period of stoppage, but if the clock is stopped for several days or weeks, that would be very inconvenient. Also, when such an item is sold, it is necessary to adjust it to correct starting position.

The weekday dial can be set manually merely by rotating the co-axial drive pinion 30 on the back side of the back plate 32. Rotating this pinion 30 causes pinion 28 to rotate, which rotates gear 26 and gear 34, and causes the arm 38 and pawl 48 to advance all the calendar dials, including the weekday dial. While the weekday dial is being adjusted to starting position, the clock hour hand will be advancing also. The user can note the advance of the weekday dial with relation to the movement of the hour hand past twelve o'clock, and make sure that the hour hand is correctly set for a. m. or p. m. The pinion 30 can be rotated with the index finger easily, but service personnel taking care of these clocks at frequent intervals can easily make up a socket wrench or crank.

After the hour hand and weekday dial are moved to the correct position for starting the clock, the day of the month and the month of the year can each be set independently, without disturbing each other or the previous setting of the weekday dial and hour hand.

The month dial is provided with a series of twelve spaced apertures 148. A manual adjustment lever 150 is pivoted at 152 and has a flange 154 by means of which it may be rotated clockwise to the position indicated in Figure 5. The lower end of the lever 150 carries an arm 156 projecting across under the dial 68. The arm is resilient and curves into an upwardly inclined prong 158. By pulling the lever back to the position of Figure 5 and then pushing it in a counter-clockwise direction to the extent indicated in dotted lines for the prong 158, the prong can be slipped into one of the holes 148 and then pushed in to rotate the month dial to the next position.

Similarly, pivoted on the same axis 152, I provide a day lever 160 with a pull flange 162 and a resilient arm 164 ending in the upwardly turned prong 166. This prong performs the manual adjustment function for both the day dials 54 and 56. Except when the dial 54 is positioned with the recess 168 occupying the working stroke of the prong 166, the prong 166 will engage one after another of the holes 170 and notches 172 and rotate the covered dial step by step. When the covered dial is pushed into the position where the recess 168 registers with the prong 166, the prong 166 will extend up through the recess and engage holes 174 or notches 176 in the covering dial until the covering dial moves to bring its hiatus slot 178 in register with the stroke of the prong 166. At the time this happens, the pin 86 will simultaneously drag the dial 54 over so that the next retraction of the lever 160 will get the prong 166 into the hole 170 adjacent the indicia "26." In this way the user can set the device up initially for operation, or restore it to proper condition after a period of disuse. Clockwise displacement of both levers 150 and 160 is prevented by a lug 161 on the adjacent corner of the back plate 32. When the device is in use, it will be enclosed in a conventional housing (not shown) which protects all of it from dust, and protects levers 150 and 160 and the pinion 30 from being tampered with.

For simplicity in mechanical construction the axial spacing of the parts is maintained by integral flanges. Thus, arcuate flanges 180 and 182 struck up from the back plate 32 have loose guiding contact with the rear face of the month dial 68. The bell crank lever 108 slides on the front face of the month dial and has a flange 184 on its upper arm, a flange 186 on its descending arm, and two flanges 188 on the cam arm 116. These flanges have guiding contact with the rear face of the covered dial 54. A peripheral washer 190 (see Figure 4) maintains a desirable axial spacing between the dials 54 and 56, combined with a small and desirable amount of friction to prevent rattling, and the space between the dial 56 and the weekday dial 58 is similarly maintained by a similar washer 192.

The back plate 32 has four lugs 194, 198, 202 and 206, abutting hook lugs 196, 200, 204 and 208 on the face plate 70. These may be soldered or bolted together, but I prefer to make the lugs 194, 198, 202 and 206 resilient and spring them toward each other to effect assembly. Correct spacing between the face plate 70 and the back plate 32 is assured by three abutment pins 210, 212 and 214.

Figure 13:
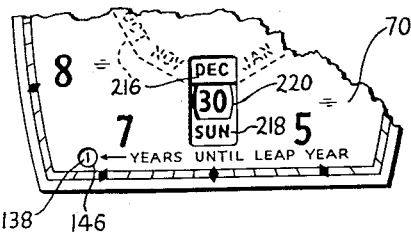
Figure 13 is a detail of a modified month indicator.

Referring now to Figure 13, it will be obvious that if the user desires all the calendar showings to be at the same spot, the month indicator 132 may be replaced with an indicator 216, positioned under the clock face 70 instead of on top of it. Such an indicator carries the month indicia along with it, and the weekday indicia can be moved radially out to appear at 218 below the day of the month. The windows 220 take the place of the windows 62 of Figures 1 and 2, and the remainder of the mechanism can remain unaltered.

Others may readily adapt the invention for use under various conditions of service by employing one or more of the novel features disclosed, or equivalents thereof. The sequence of movements that constitute the cycle is not in any sense limited to the Gregorian calendar, or to any calendar. Any automatic "programming" function can be governed by equipment according to the invention. The number of sequence members interconnected as the members 54 and 56 are is not limited to two. The month member 68 might be shaped to let the pawl 48 reach another member, at predetermined points during its cycle of movement, and so on indefinitely.

As at present advised with respect to the apparent scope of my invention, I desire to claim the following subject matter:

1. Means for indicating, seriatim, a series of related indicia comprising, in combination: a stationary display face; a plurality of indicating discs stacked behind said face and rotatable around a common axis; all said indicating discs having peripheral notch projections extending out into the same peripheral annular zone; a pawl movable peripherally to and fro adjacent said annular zone in the general direction of the adjacent portion of said annular zone; said pawl having a plurality of disc-driving pawl portions; each pawl portion lying in the transverse plane of one of said discs and being adjustable toward and away from the disc axis into and out of operative position for advancing its cooperating disc; yielding means tending to adjust each disc-driving pawl portion radially inward towards operative position; and means for reciprocating said pawl for step by step advancement of such discs as are operatively related to their disc-driving pawl portions; certain of said discs being control discs and having peripheral lands between said projections for engaging the pawl and limiting the movement toward operative position of the disc-driving pawl portion cooperating with a different disc, others of said discs being controlled discs and having their projections terminating in said annular zone at radial distances such that a control disc determines the operativeness of the disc-driving pawl portion of the controlled disc as a function of the position of the control disc.

2. Indicating means according to claim 1 in which said pawl reciprocating means is an arm pivoted at one end on a fixed axis; said pawl being pivoted on said arm at a point remote from said fixed axis and adjacent said peripheral zone.

3. Indicating means according to claim 2 in which said fixed axis is coincident with the axis of said discs.

4. Indicating means according to claim 3 in which said stationary display face is a clock face, carrying conventional hour indicia and said discs include a week day dial next behind said clock face; a first half-month day number dial next behind said week day dial; a second half-month day number dial next behind said first half-month day number dial; a month disc next behind said second half-month day number dial; said week day dial having a plurality of windows; one for each position of said week day dial, for exposing underlying indicia on either of said half-month dials; said first half-month dial having a single window opening for exposing indicia on said second half-month dial; said clock face having a stationary window for exposing underlying registering indicia on said week day dial and on either of said half-month dials; said month disc being concealed from view; a month dial in front of said clock face; stationary month indicia on said clock face; said month dial having a window for exposing said month indicia; and a connection for rotating said month dial in unison with said concealed month disc.

5. Indicating means according to claim 4, in which said month indicia are peripherally placed in radial alignment with the hour indicia; each month being radially aligned with the hour having the same number as the number of the month.

6. Indicating means according to claim 1 in which all said disc-driving pawl portions are adjacent aligned edge portions of a single rigid pawl edge; said edge lying generally parallel to the axis of said discs and extending across the transverse planes of all said discs.

7. A calendar clock comprising, in combination: a stationary clock face; four discs stacked behind said face and a fifth disc in front of said face; the disc next behind said face indicating the day of the week; the second disk indicating the day of the month for about half the month; the third disc indicating the day of the month for the remainder of the month; the fourth disc being concealed from view and mechanically connected to rotate the fifth disc in front of the face; the movement of said fourth and fifth disc corresponding with the months of the year; and cam means actuated by said fourth disc for adjusting the relative positions of said third and fourth discs to vary the number of days in the month.

8. A calendar clock comprising, in combination: a stationary clock face; four discs stacked behind said face and a fifth disc in front of said face; the three discs next behind said face indicating the day of the week; the day of the month during about half of each month, and the day of the month during the remainder of the month, respectively; the fourth disc being connected to drive the fifth disc; the fifth disc being a dial indicating the month of the year.

9. In a calendar clock, in combination: a stationary clock face carrying hour indicia from one to twelve in the customary positions; said face having month indicia from January through December, circumferentially arranged closer to the center of the face than said hour indicia; and an indicator dial normally covering all but one of said month indicia, but none of said hour indicia; said month indicia being positioned with January radially aligned with one o'clock, February with two o'clock and so on.

References Cited in the file of this patent

UNITED STATES PATENTS

| | | |
|---|---|---|
| 1,755,696 | Kluge | Apr. 22, 1930 |
| 2,458,092 | Morris | Jan. 4, 1949 |